United States Patent [19]
Kushigian

[11] 4,050,571
[45] Sept. 27, 1977

[54] WALKING BEAM TRANSFER MECHANISM WITH SINGLE ACTUATOR MEANS TO CAUSE BOTH LIFTING AND CARRYING

[76] Inventor: Anthony Kushigian, 720 E. Baseline Road, Northville, Mich. 48167

[21] Appl. No.: 685,126

[22] Filed: May 10, 1976

Related U.S. Application Data

[63] Continuation of Ser. No. 485,793, July 5, 1974, abandoned.

[51] Int. Cl.² ............................................. B65G 25/02
[52] U.S. Cl. ...................................... 198/774; 198/488
[58] Field of Search ............... 198/774, 775, 776, 487, 198/488, 737, 740

[56] References Cited

U.S. PATENT DOCUMENTS

| 2,907,236 | 10/1959 | Peterson | 198/774 |
| 3,086,642 | 4/1963 | Schwarz | 198/774 |
| 3,161,284 | 12/1964 | Ashworth | 198/774 |
| 3,662,876 | 5/1972 | Hollis | 198/774 X |

Primary Examiner—Evon C. Blunk
Assistant Examiner—Richard K. Thomson
Attorney, Agent, or Firm—Barnes, Kisselle, Raisch & Choate

[57] ABSTRACT

A workpiece transfer mechanism having a walking beam carried by a slide mounted for reciprocal movement on a bed or table. A particular bell crank linkage is provided so that a single hydraulic cylinder both raises and lowers the walking beam with respect to the slide and also moves the slide longitudinally with respect to the table. The table is carried by a second slide for reciprocation of the table by a second hydraulic cylinder.

6 Claims, 13 Drawing Figures

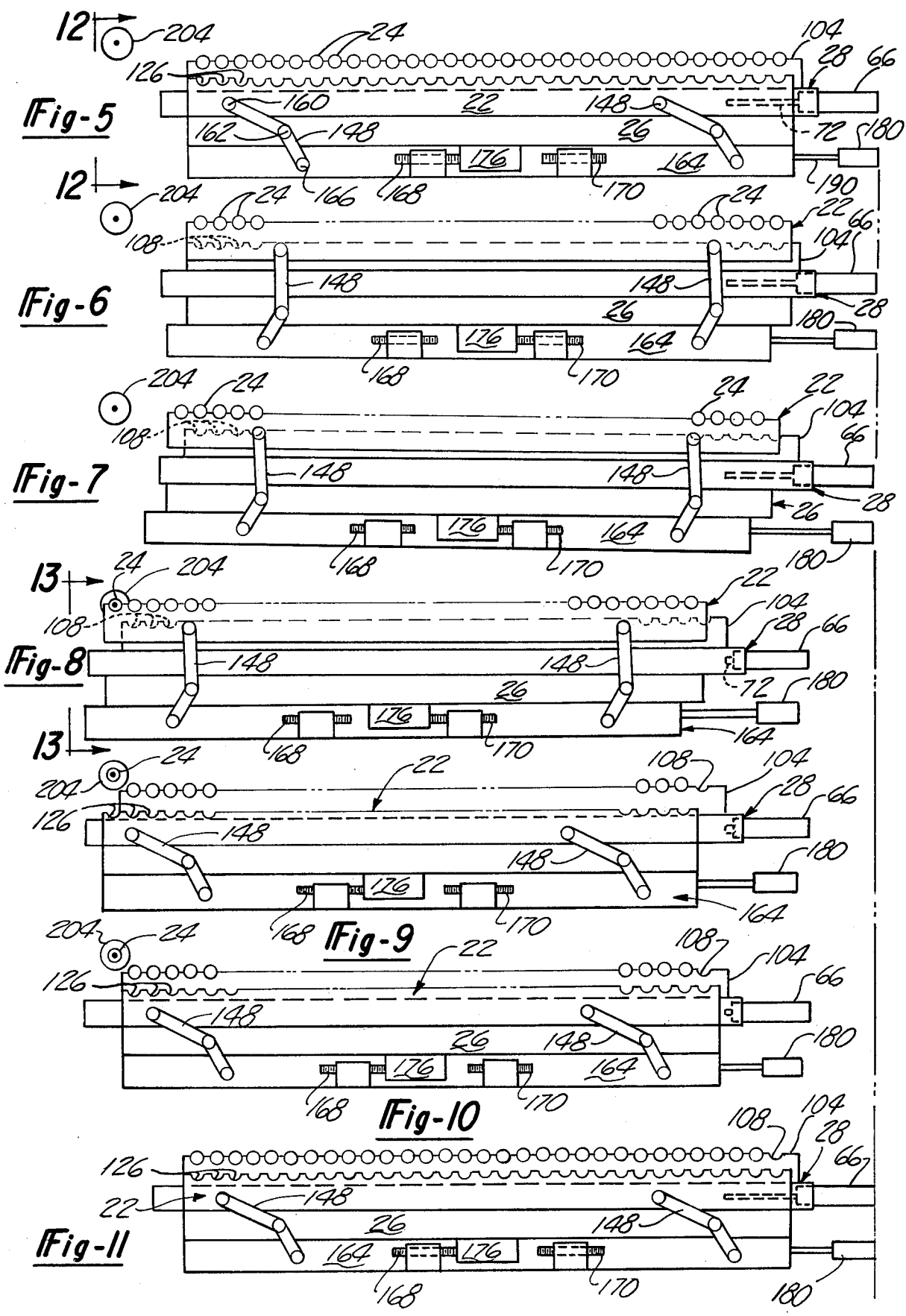

WALKING BEAM TRANSFER MECHANISM WITH SINGLE ACTUATOR MEANS TO CAUSE BOTH LIFTING AND CARRYING

This is a continuation of application Ser. No. 485,793, filed July 5, 1974 (now abandoned).

This invention relates to mechanisms for transferring workpieces to a work station of a machine tool and, more particularly, to a walking beam transfer mechanism of the lift-and-carry type.

Objects of this invention are to provide a walking beam transfer mechanism that achieves effective, discrete part handling; that is of simplified design and construction and yet is rugged and reliable; that achieves effective lifting and indexing using only a single actuator; that is versatile and readily adapted for transferring parts of different size and configuration; that operates smoothly; that allows adjustment of the vertical lift and/or the horizontal index travel of the walking beam in a simple and convenient manner; that is readily adapted to provide different uniform spacings of the workpieces carried so that different parts can be transferred at optimum speeds; and/or that is of comparatively economical manufacture.

These and other objects, features and advantages of this invention will be apparent from the following description, the appended claims and the accompanying drawings in which:

Figure 1:
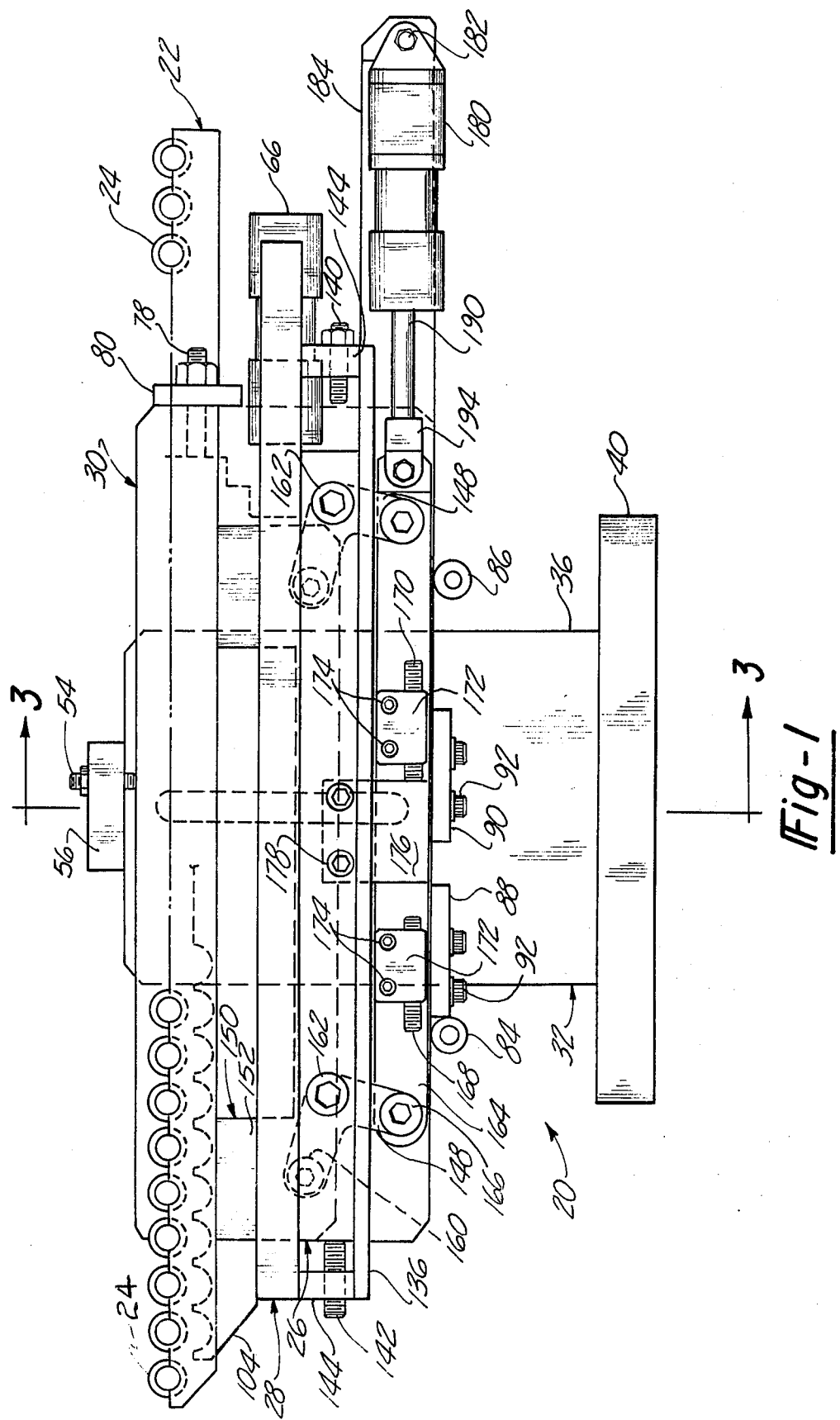
FIG. 1 is a side view of a walking beam transfer mechanism embodying this invention with the front workpiece support cradle and guide plate removed and with the walking beam raised, forward indexed and fully extended.
Figure 2:
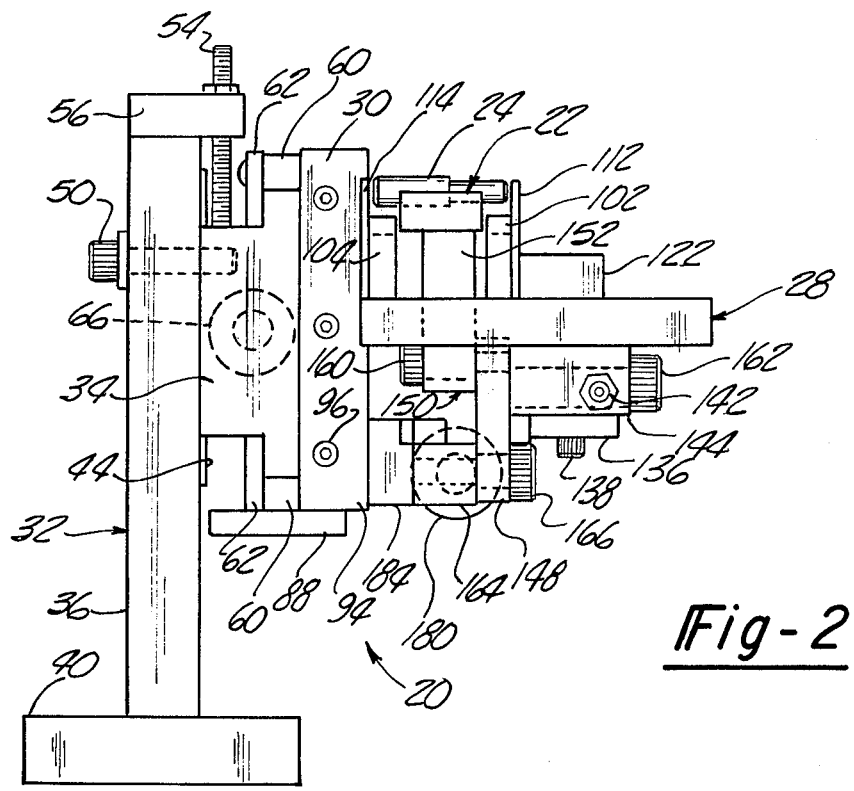
FIG. 2 is an end view of the transfer mechanism of FIG. 1 with the front workpiece support cradle and guide plate in place.
Figure 12:
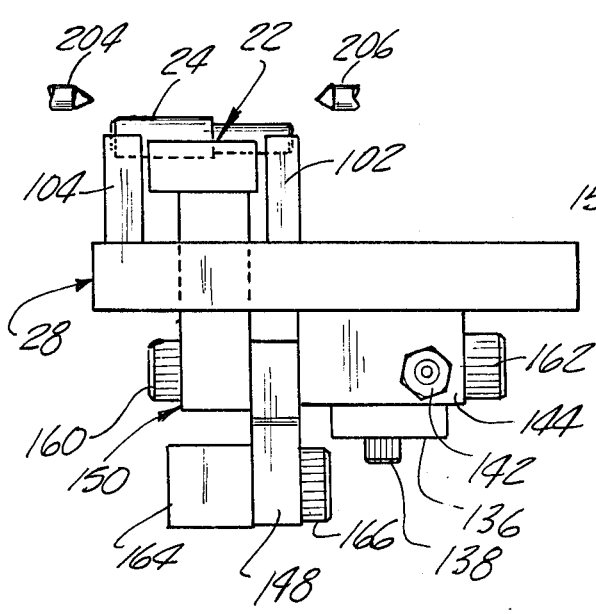
Figure 13:
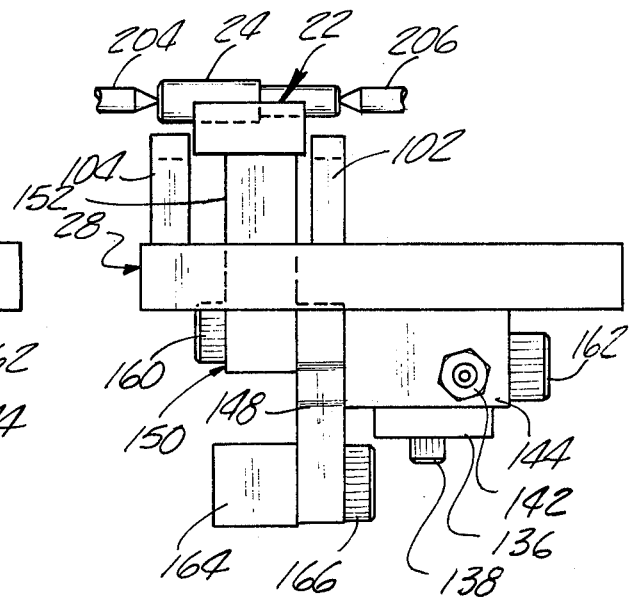
Figure 3:
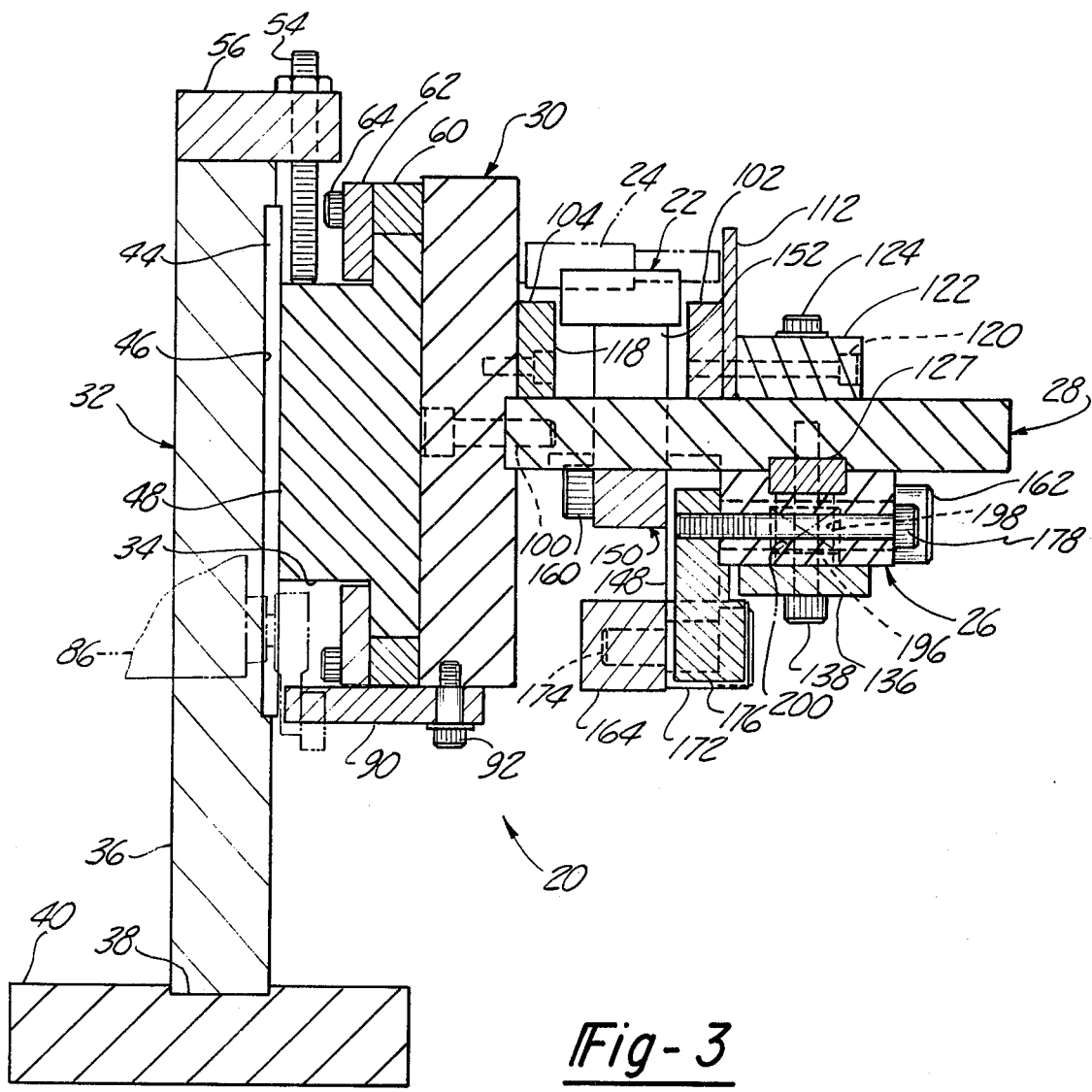
FIG. 3 is a sectional view on line 3—3 of FIG. 1 with the front workpiece support cradle and guide plate in place.
Figure 4:
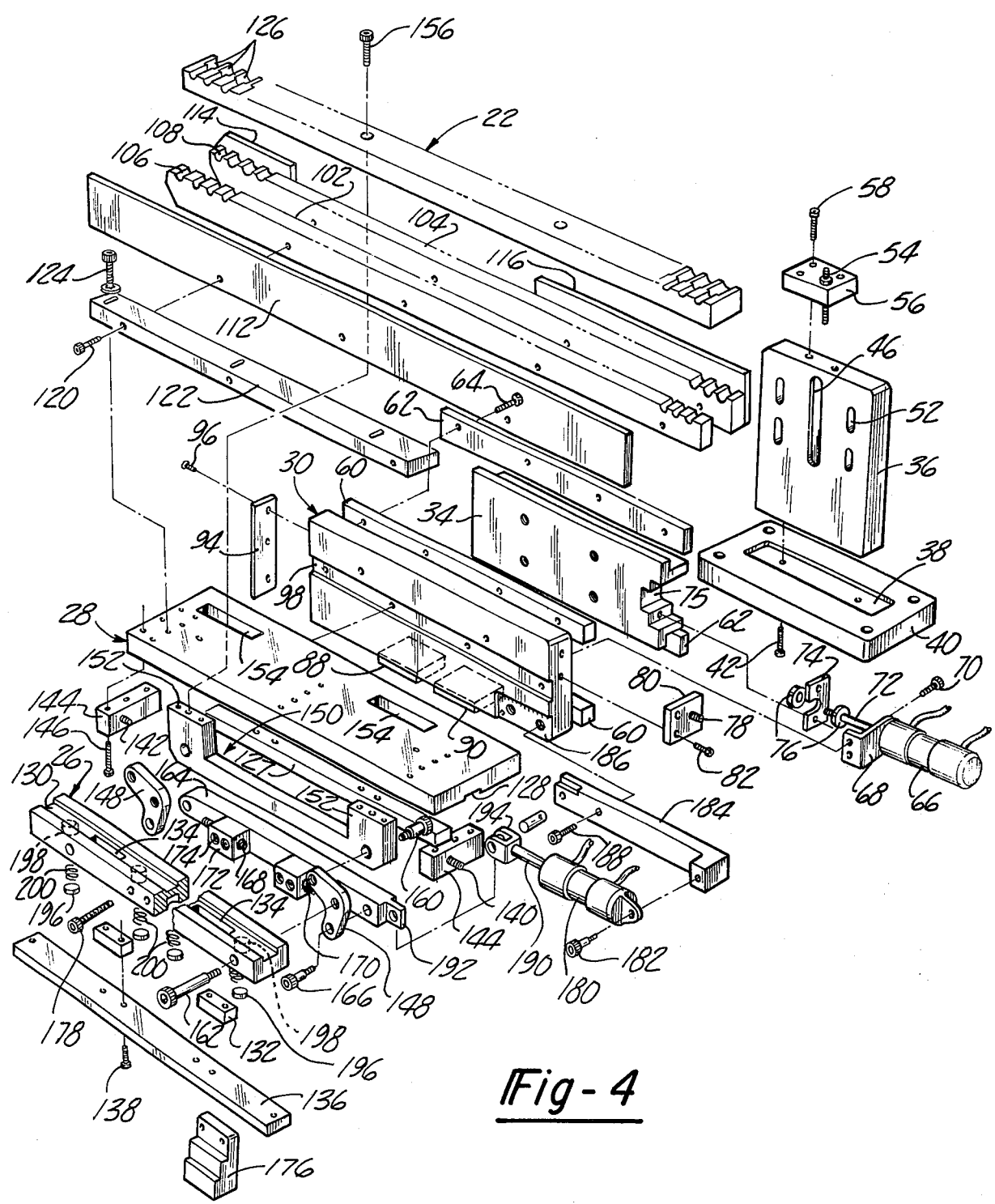
FIG. 4 is an exploded isometric view of the component parts of the transfer mechanism of FIG. 1.

FIGS. 5-11 are semischematic side views illustrating the position of major component parts of the transfer mechanism of FIG. 1 when the walking beam is in the start, raised, forward indexed, fully extended, lowered, reverse indexed, and fully retracted positions, respectively, in relation to a workpiece center in a work station of a machine tool which receives workpieces one at a time from the transfer mechanism;

FIG. 12 is a semischematic end view on line 12—12 of FIG. 5 illustrating the start position of the major component parts of the transfer mechanism of FIG. 1 in relation to the workpiece centers of the machine tool, which centers are shown in the retracted position; and FIG. 13 is a semischematic end view on line 13—13 of FIG. 8 illustrating the fully extended position of parts of the transfer mechanism of FIG. 1 in relation to the centers of the machine tool, which centers are shown in the extended position engaging a workpiece.

Referring in more detail to the drawings, FIGS. 1-4 illustrate a transfer mechanism 20 embodying this invention which has a walking beam 22 for lifting and carrying workpieces. 24. Walking beam 22, illustrated in its raised and indexed position in FIG. 1, is carried by a slide 26 mounted on a supporting bed or table 28 for reciprocating the walking beam with respect to the table. Table 28 is carried by a second slide 30 mounted on a base 32 for generally longitudinal reciprocation of the table with respect to the base.

Slide 30 is carried on a T-shaped way plate 34 secured to a riser plate 36, the lower end of which is received in a pocket 38 of a base plate 40 and fastened therein by cap screws 42. Way plate 34 is guided for vertical movement on riser plate 36 by a key 44 (FIGS. 2 and 3) received in a pocket 46 in the riser plate and a groove 48 in the rear face of way plate 34. Way plate 34 is secured in the desired position of vertical adjustment on riser plate 36 by a plurality of cap screws 50 extending through elongated slots 52 in the riser plate. An adjustable stop limiting the vertically upward movement of way plate 34 with respect to riser plate 36 is provided by a screw 54 received in a mounting block 56 secured to the upper end of the riser plate by cap screws 58.

Slide 30 is mounted for reciprocation on way 34 by a pair of upper and lower keeper spacers 60 and way keepers 62 secured to slide 30 by cap screws 64. Slide 30 is reciprocated on way plate 34 by a hydraulic cylinder 66 mounted by a bracket 68 and cap screws 70 on slide 30. The piston rod 72 of cylinder 66 is connected to way plate 34 by a bracket 74 fixed in a pocket 75 thereof and jamb nuts 76 threaded on rod 72 and bearing on opposed faces of the bracket to permit axial adjustment of the rod in relation to way plate 34 and hence adjustment of the starting position of table 28 and slide 30 relative to base 32. The extent of the forward travel of slide 30 relative to way plate 34 is limited by an adjustable stop screw 78 received in a plate 80 secured to slide 30 by a cap screw 82 and positioned for abutment with an end of way plate 34. To indicate when slide 30 is in the fully extended and retracted positions, a pair of limit switches 84, 86 (FIGS. 1 and 3) fixedly mounted on way plate 34 are tripped by adjustable dogs 88, 90, respectively, secured by cap screws 92 to slide 30. A cover plate 94 is secured to the end of slide 30 by cap screws 96.

An edge of table 28 is received in a groove 98 of slide 30 and secured therein by cap screws 100 for reciprocation of the table with the slide. A plurality of workpieces 24 are carried on table 28 by front and back workpiece support cradles 102, 104, each of which has a plurality of equally longitudinally spaced semicircular cradle recesses 106, 108 therein for receiving opposed ends of workpieces 24. Preferably, the radius of each recess 106, 108 is only slightly greater than the radius of the corresponding generally cylindrical reduced shank and enlarged head, respectively, of workpieces 24. Axial shifting of workpieces 24 in workpiece support cradles 102 and 104 is limited by a front workpiece retainer plate 112 and rear retainer plates 114, 116 together with a vertical face of slide 30. Rear retainer plates 114, 116 are fixed to workpiece support cradle 104 which is secured in abutment with table 28 to slide 30 by cap screws 118. Front workpiece support cradle 102 and retainer plate 112 are fastened by cap screws 120 to a mounting bar 122 secured to table 28 by cap screws 124. Walking beam 22 has a plurality of equally longitudinally spaced axially extending semicircular stepped cradle recesses 126 thereon for receiving workpieces 24 therein. As will later be apparent, walking beam 22 picks up all of the workpieces 24 from the support cradles 102, 104 and indexes the workpieces in a direction toward the left as viewed in FIG. 1 so that the workpiece at the far left is moved into a work station; and then, when the beam is lowered, the remaining workpieces are deposited in the next adjacent recesses 106, 108 in cradles 102, 104.

Walking beam 22 is carried between workpiece support cradles 102, 104 adjacent the upper face of supporting cradles 102, 104 adjacent the upper face of supporting bed or table 28 by means of slide 26 which in turn is mounted on the under face of table 28 for longitudinally reciprocating the walking beam. Longitudinal movement of slide 26 on the under face of table 28 is guided by a key 127 received in mating grooves 128, 130 in the table and slide, respectively. Slide 26 is retained on table 28 by spacer blocks 132 received in elongate clearance slots 134 in the slide and an underlying keeper bar 136 which is secured along with key 127 to table 28 by cap screws 138. Adjustable stops limiting the travel of slide 26 are provided by adjustment screws 140, 142 received in end spacer blocks 144 interposed between keeper bar 136 and table 28 and secured thereto by cap screws 146.

Walking beam 22 is movably mounted on slide 26 by a pair of bell cranks 148 and a generally U-shaped lifter bar 150 having legs 152 that project through elongated clearance slots 154 in table 28 and are secured to the walking beam by cap screws 156. The bell cranks 148 are pivotally connected at their upper ends to lifter bar 150 by pivot screws 160, at their centers to slide 26 by pivot screws 162, and at their lower ends to a link bar 164 by pivot screws 156. In general, and as will later be explained in greater detail, initial longitudinal shifting of bar 164 relative to slide 26 pivots bell crank 148 to raise or lower lifter bar 150 and walking beam 22 relative to slide 26; and further shifting of bar 164 causes bell cranks 148, slide 26, lifter bar 150 and walking beam 22 to index horizontally. The extent of the vertical travel of walking beam 22 is limited by limiting horizontal shifting of bar 164 relative to slide 26. To this end, adjustable stop screws 168, 170 are threaded in blocks 172 which are secured by cap screws 174 to link bar 164. Screws 168, 170 are arranged to engage opposite ends of an abutment block 176 secured by cap screws 178 to slide 26.

Walking beam 22 is raised and lowered generally vertically and also indexed in forward and rearward directions longitudinally of table 28 by a single hydraulic cylinder 180, the housing of which is connected by a pivot screw 182 to one end of a mounting bracket 184 fastened in a recess 186 of slide 30 by cap screws 188. The piston rod 190 of cylinder 180 is pivotally connected to a tang 192 of link bar 164 by a clevis and pin assembly 194 fixed to the free end of piston rod 190. To ensure that cylinder 180 will completely raise and lower walking beam 22 before causing the beam to index longitudinally, longitudinal movement of slide 26 relative to table 28 is yieldably restrained by a plurality of friction discs 196 bearing on keeper bar 136. Friction discs 196, preferably of a brake lining material, are received in blind pockets 198 in slide 26 and resiliently urged by springs 200 into engagement with keeper bar 136.

In one application for the present invention, transfer mechanism 20 is used to transfer a plurality of workpieces 24, such as taps, into a work station of a machine tool such as a machine for grinding a chamfer on the head end of the taps. As shown in FIGS. 5–13, transfer mechanism 24 is arranged to transfer the taps one at a time into the proper position between a pair of opposed dead centers 204, 206 of the machine tool. When the centers 204, 206 are extended to hold a tap, the tap is then rotated by suitable means (not shown) while a chamber is ground thereon. In each complete cycle of transfer mechanism 20, one workpiece 24 is positioned between centers 204 and 206 of the machine tool and all of the other workpieces carried by the transfer mechanism are advanced to the left (as shown in the drawings) to an immediately adjacent recess 106, 108 of cradles 102, 104.

To facilitate description of the operation of transfer mechanism 20, some of the component parts thereof are shown semischematically in FIGS. 5–11 in which the relative motion of some of the parts is exaggerated, and hence such parts including the bell cranks and the arcs traversed thereby are not to scale. Transfer mechanism 20 begins each cycle, as shown semischematically in FIG. 5, with both slide 26 and table 28 fully retracted and walking beam 22 fully lowered. This is achieved when piston rod 72 of cylinder 66 is extended and piston rod 190 of cylinder 180 is retracted. Walking beam 22 is raised to lift workpieces 24, as shown in FIG. 6, by energizing cylinder 180 to begin extending piston rod 190 thereof which shifts link 164 to the left, thereby rotating bell cranks 148 clockwise (as viewed in FIGS. 1, 4 and 5–11) on pivots 162 to raise lifter 150 and hence walking beam 22. Beam 22 picks up all of the workpieces 24 from cradles 102, 104 and lifts the workpieces above the cradles so that the workpieces can be indexed longitudinally. When link 164 has shifted to the left to the position illustrated in FIG. 6 where stop screw 170 engages block 176, beam 22 is in its fully raised position. Hence it will be apparent that the height to which beam 22 is raised can be easily adjusted for different parts by setting screw 170. During the movement of link 164 to raise walking beam 22, friction discs 196 prevent slide 26 from moving relative to table 28. However, when beam 22 reaches its fully raised position (FIG. 6) with screw 170 abutting block 176, further extension of rod 190 by cylinder 180 applies sufficient force directly to slide 26 via screw 170 and block 176 to overcome the restraint provided by friction discs 196 and move both slide 26 and walking beam 22 to the left in unison. As shown in FIG. 7, when slide 26 abuts adjustable stop screw 142 (FIG. 1), workpieces 24 are forward indexed or advanced with respect to workpiece cradles 102, 104 a distance equal to the pitch or spacing between immediately adjacent recesses 106, 108 thereof.

As shown in FIG. 8, the workpiece 24 at the extreme left end of beam 22 is moved into coaxial alignment with centers 204, 206 of the machine tool by energizing cylinder 66 to retract rod 72 thereof, thereby shifting slide 30 and table 28 and hence beam 22 to the left to the fully extended position of the slide. Stop screw 78 determines when slide 30 is fully extended to position part 24 at the far left between centers 204 and 206. As slide 30 reaches its fully extended position, dog 88 trips limit switch 84 which, through an appropriate electropneumatic or electrohydraulic circuit (not shown), extends centers 204, 206 of the machine tool toward each other to engage and support the workpiece 24 at the extreme left end of walking beam 22. Although the longitudinal indexing step of FIG. 7 and loading step of FIG. 8 have been described as consecutive steps, it will be understood that they can be carried out concurrently as soon as the workpieces are raised sufficiently to clear the cradles 102, 104. To this end, the control circuit for cylinder 66 can be arranged to actuate the cylinder automatically after a short time delay from the actuation of cylinder 180.

Lowering of walking beam 22 is initiated by the engagement of centers 204, 206 with the workpiece 24 which, through appropriate circuitry (not shown), energizes cylinder 180 which moves link 164 to the right to pivot bell cranks 148 counterclockwise on screws 162, thereby lowering walking beam 22 to the position shown in FIG. 9. As walking beam 22 is lowered, friction discs 196 restrain slide 26 from being moved to the right by cylinder 180 until screw 168 engages block 176, whereupon continued actuation of cylinder 180 moves slide 26 to the right until it engages stop screw 140 (FIG. 1), thereby reverse-indexing beam 22 to the position shown in FIG. 10. Suitable control circuitry (not shown) energizes cylinder 66 to extend piston rod 72 thereof, thereby moving table 28 and walking beam 22 to the fully retracted position shown in FIG. 11. This returns all of the components of transfer mechanism 20 to the starting position shown in FIG. 5 with dog 90 on slide 30 tripping limit switch 86 to indicate that transfer mechanism 20 is ready to begin another cycle. Again cylinder 66 could be energized automatically after a short time delay from the energization of cylinder 180.

During initial setup of the transfer mechanism 24, walking beam 22 is fully extended, as shown in FIG. 8, and the workpiece 24 carried at the extreme left or forward end of the walking beam is aligned with the centers 204, 206 of the machine tool by adjusting stop screw 78. The alignment of recesses 126 of the walking beam 22 with recesses 106, 108 of support cradles 102, 104 for picking up workpieces from the cradles is adjusted by stop screw 140 and the alignment of recesses 126 with recesses 106, 108 for depositing workpieces therein is adjusted by stop screw 142.

Transfer mechanism 24 can be readily adjusted to handle different diameter workpieces requiring different length and indexing strokes of the walking beam. This may be accomplished by replacing walking beam 22 and workpiece support cradles 102, 104 with a walking beam and workpiece support cradles having the workpiece receiving recesses thereof longitudinally spaced apart thereon a distance equal to the desired length of indexing stroke and by adjusting the length of indexing stroke of the transfer mechanism. If the replacement walking beam and support cradles are designed to position the center line of the workpiece carried in the extreme left or forward recesses thereof so that it is coincident with the center line of the workpiece carried in the extreme left or forward recess of walking beam 22 and support cradles 104, 106, the desired length of indexing stroke of the replacement walking beam may be provided by simply adjusting only stop screw 140. Since this arrangement requires adjustment of only stop screw 140 to provide the desired length of indexing stroke, the replacement walking beam, when fully extended, will position the workpiece carried in the extreme left or forward end thereof in alignment with the centers 204, 206 of the machine tool without any adjustment of stop screw 78. Although it is preferred to change the length of the index travel by adjusting only stop screw 140, the index travel can also be adjusted by setting stop screws 140 and 142 with corresponding adjustment of stop screw 78 so that the extreme left workpiece carried by the walking beam ends up between centers 204 and 206. Thus transfer mechanism 20 may be readily and economically adapted to handle a wide range of workpieces requiring different index travel since the walking beam and support cradles are relatively inexpensive tooling.

The extent of the generally vertical travel of walking beam 22 can be adjusted by adjusting stop screws 168, 170. For many applications, the vertical travel limit can be set so that the largest part clears cradles 102, 104; and hence smaller parts will also clear cradles 102, 104, assuming cradles of the same height are used. On the other hand, transfer speeds can be optimized by using the shortest possible vertical and horizontal travel. When changing the length of vertical travel of walking beam 22, it may be desirable or, in some cases, necessary to either use shorter or taller support cradles 104, 106 in order to position workpieces carried thereby at a vertical height relative to table 28 which permits walking beam 22 to disengage from the workpieces when in the fully lowered position and to disengage the workpieces from the workpiece support cradles in the fully raised position. Preferably, the bell cranks 148 are arranged so that the bell crank arm connected to lifter bar 150 extends horizontally when walking beam 22 is halfway between its raised position and the lower position at which parts are deposited on support cradles 102, 104. This will minimize horizontal displacement of walking beam 22 by rotation of the bell cranks.

In many situations, workpieces may be transferred to a machine tool by transfer mechanism 20 without using the additional travel of the walking beam 22 provided by reciprocation of table 28 and slide 30. Depending on the nature of the machine tool or other work station, sufficient horizontal travel can often be provided by the horizontal indexing of slide 26 by cylinder 180, link 164 and bell cranks 148. In such situations, a transfer mechanism embodying this invention would not have a slide 30, way 34 and cylinder 66; and the supporting bed or table 28 could be fixed to a stationary base, such as base 32. The additional horizontal travel provided by slide 30 in the embodiment previously described was used for a particular application so that the walking beam 22 could be withdrawn sufficiently from centers 204, 206 so as not to interfere with the particular mechanism (not shown) used to rotate a particular type of workpiece 24, i.e., rotate a tap in a chamfer grinding machine.

According to one important aspect of the present invention, cylinder 180 and its associated piston (not shown) are the sole power means for causing both horizontal and vertical indexing of the walking beam. Using a single cylinder 180 to move a walking beam both horizontally and vertically provides a transfer mechanism that is of simplified design and construction, operates smoothly and is readily adapted for handling different parts. Smooth operation minimizes wear on the transfer mechanism and, most importantly, minimizes damage to the parts being handled. The versatility and adaptability of this transfer mechanism to various size workpieces and different machine tools is greatly enhanced by a walking beam drive mechanism providing independent adjustment of vertical travel, horizontal travel, fully raised and lowered positions and fully extended and retracted positions. By simply changing the walking beam and workpiece support cradles and, as required, adjusting the length of the indexing stroke of the walking beam, the transfer mechanism of this invention can be readily adapted to handle workpieces of different sizes and/or requiring index strokes of differing lengths.

It will be understood that the transfer mechanism has been described thereinabove for purposes of illustration and is not intended to indicate limits of the present invention, the scope of which is defined by the following claims.

I claim:

1. A transfer mechanism comprising a bed, a slide carried by said bed for horizontally reciprocal movement relative to said bed along a first path between spaced-apart extended and retracted positions of said slide, a plurality of part supports equally spaced apart generally in one direction along said first path, a unitary walking beam having a plurality of part cradles equally spaced apart generally in one direction along said first path, said part cradles being integrally interengaged for comovement with each other, said walking beam being carried by said first slide for movement therewith along said path and for movement generally transverse to said path, a pair of bell cranks spaced from each other in said one direction, each of said bell cranks having a pair of rigidly integral lever arms joined at an apex and being pivotally fastened at its apex on said slide such that said bell cranks move horizontally in unison with said slide, one of said arms of each bell crank being pivotally fastened to said walking beam such that pivotal movement of said bell cranks on said slide moves said walking beam vertically relative to said slide, horizontally reciprocating actuating linkage comprising an actuating bar, each of said bell cranks being pivotally fastened to said linkage with at least one of said bell cranks being pivotally fastened to said actuating bar such that initial movement of said actuating bar in one direction pivots both bell cranks in unison to move said walking beam vertically, abutment means for interengaging said actuating bar and said slide at the completion of said initial movement of said bar so that continued movement of said bar in said one direction causes said slide, said bell cranks and said walking beam to move in unison in said one direction.

2. The transfer mechanism of claim 1 wherein said bell cranks move said walking beam vertically between extended and retracted positions and wherein said transfer mechanism further comprises variable adjusting means for locating at least one of said extended and retracted positions of said walking beam, said adjusting means being mounted on said abutment means so that the travel of said actuating means during said initial movement can be adjusted to thereby determine the amount of vertical movement of said walking beam prior to interengagement of said actuating bar with said slide.

3. The transfer mechanism set forth in claim 1 further comprising variable adjustment means for locating at least one of said extended and retracted positions of said slide with respect to said part supports to thereby set the travel of said slide during said continued movement of said actuating bar.

4. The transfer mechanism set forth in claim 3 wherein said adjustment means locates said retracted position of said slide so that the length of travel of said slide between its retracted and extended positions can be varied while maintaining a fixed location of said extended position of said slide relative to said bed.

5. The transfer mechanism set forth in claim 1 further comprising restrainer means yieldably restraining movement of said first slide from its retracted position toward its extended position while said actuator means undergoes said initial movement to pivot said bell cranks.

6. A transfer mechanism comprising a bed, a first slide carried by said bed for reciprocal movement relative to said bed along a first path between spaced-apart, extended and retracted positions of said slide, a plurality of part supports equally spaced apart generally in one direction along said first path, a walking beam having a plurality of part cradles equally spaced apart generally in one direction along said first path, said walking beam being carried by said first slide for movement therewith along said path and for movement generally transverse to said path, lift means carried by said first slide and operably connected to said walking beam for moving said walking beam generally transversely to said path to an extended position to thereby disengage parts from said part supports and to a retracted position to deposit at least some of the parts carried by said walking beam on said part supports, and single actuator means operably connected to both said lift means and said first slide for causing said first slide to move between its said extended and retracted positions and for causing said walking beam to move between its said extended and retracted positions so that, with said slide and walking beam in their said retracted positions, said actuator means causes said walking beam to move to its said extended position while disengaging parts from said part supports; with said walking beam in its said extended position, said actuator means causes said first slide to move to its said extended position to advance the parts carried by said walking beam relative to said part supports; with said first slide in its said extended position, said actuator causes said walking beam to move to its said retracted position while depositing at least some of said parts carried by said walking beam on said part supports in an advanced position relative to the position from which said walking beam previously disengaged such parts from said part supports; and with said walking beam in its said retracted position, said actuator moves said first slide to its said retracted position, and wherein said transfer mechanism further comprises a base, a second slide carried by said base for generally reciprocal movement along said path relative to said base to spaced-apart extended and retracted positions thereof, said bed being fixedly carried by said second slide for movement of said bed, said part supports and said first slide therewith relative to said base.

* * * * *